United States Patent [19]

Kraffczyk et al.

[11] 3,884,641
[45] May 20, 1975

[54] REACTION CHAMBER UNIT FOR TEST STRIPS

[75] Inventors: Friedrich Kraffczyk; Roland Helger, both of Darmstadt, Germany

[73] Assignee: Merck Patent Gesellschaft mit beschraenkter Haftung, Darmstadt, Germany

[22] Filed: June 7, 1973

[21] Appl. No.: 367,951

[30] Foreign Application Priority Data
Oct. 11, 1972 Germany............................ 2249669

[52] U.S. Cl.............. 23/253 R; 23/254 R; 23/292; 195/103.5 R; 195/127; 206/305; 220/41; 312/31.1; 312/31.3; 312/330 R
[51] Int. Cl. ... B01l 3/00; B65d 43/12; G01m 33/00
[58] Field of Search ....... 23/253 R, 253 TP, 254 R, 23/259, 292; 312/31.1, 31.3, 330 R; 220/41; 206/305, 42; 195/127, 139 US

[56] References Cited
UNITED STATES PATENTS

| | | | |
|---|---|---|---|
| 2,367,019 | 1/1945 | Haag............................... | 312/330 X |
| 2,528,819 | 11/1950 | Cohn et al. ........................ | 220/41 X |
| 2,635,885 | 4/1953 | Masaracchia et al........... | 312/330 X |
| 3,018,918 | 1/1962 | Tapper............................. | 220/41 |
| 3,227,505 | 1/1966 | Ambaum ........................ | 312/330 X |
| 3,563,859 | 2/1971 | Fink................................. | 195/139 X |
| 3,725,004 | 4/1973 | Johnson et al.................... | 23/292 X |

Primary Examiner—Joseph Scovronek
Attorney, Agent, or Firm—Millen, Raptes & White

[57] ABSTRACT

A reaction chamber unit for test strips having one or more reaction and indicator zones for the analytical determination of reactions involving gas evolution, consisting of a slide tray which is open at the top and at one end for receiving the test strip, and a housing which is open at one end and the bottom to receive the slide tray, the tray and housing having inclined guide means to facilitate positioning the slide tray tightly against the inner upper surface of the housing and produce a receptacle for the test strips of defined volume and spacing between the tray bottom and the opposite surface of the cover. At least the housing is formed of clear plastic to permit viewing the indicator zone without disturbing the test strip.

6 Claims, 4 Drawing Figures

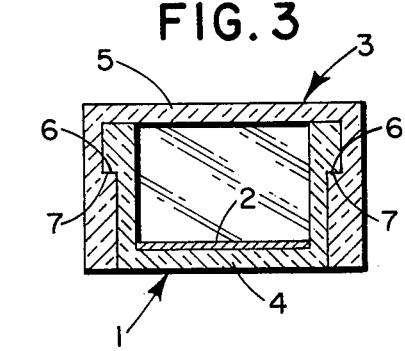
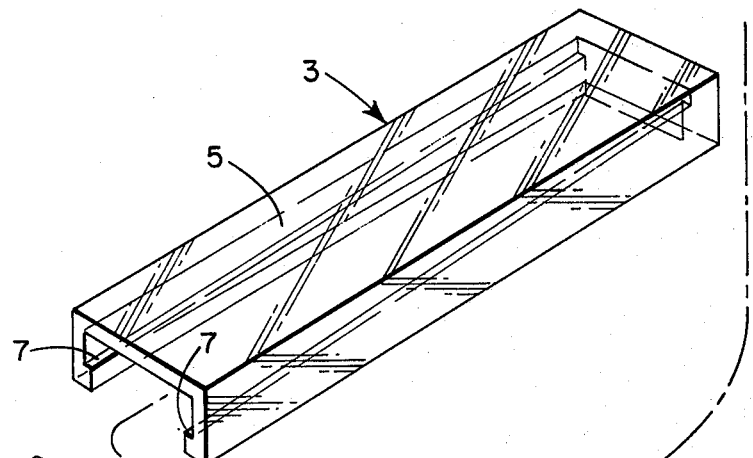
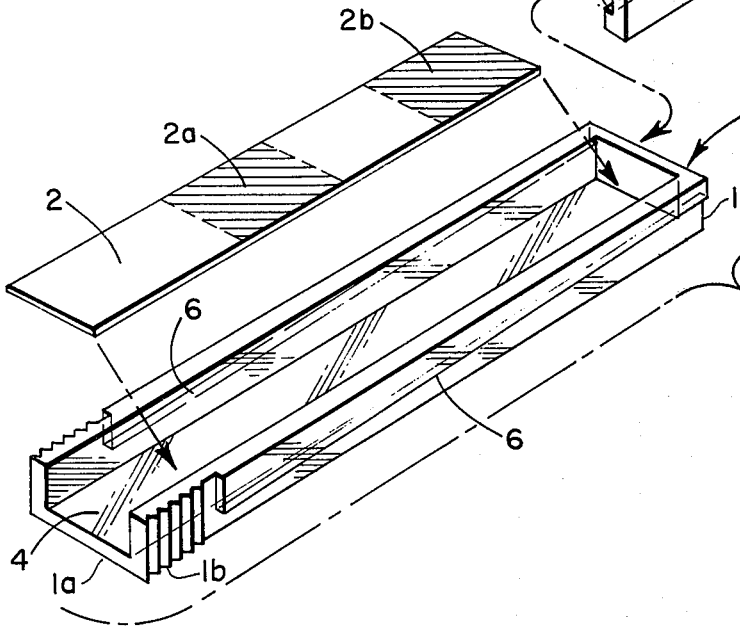
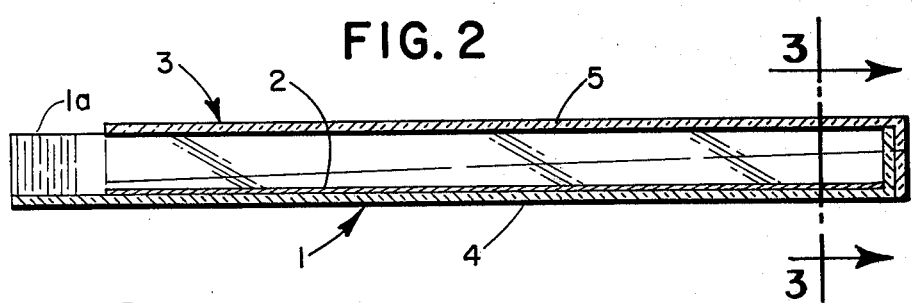
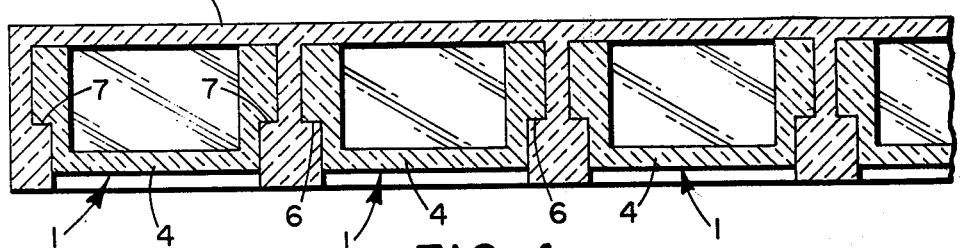

REACTION CHAMBER UNIT FOR TEST STRIPS

BACKGROUND OF THE INVENTION

This invention relates to a reaction chamber unit for test strips for the analytical determination of reactions involving the evolution of gas.

Test strips, by which various substances can be detected specifically and rapidly have gained an ever increasing importance in analytical chemistry, in clinical diagnostics and in environmental protection. Such detection is carried out predominantly with the aid of a color reaction, wherein qualitative, quantitative and/or semi-quantitative measurements can be obtained.

In addition to the test strips containing merely one indicator zone, such as, for example, pH indicator strips or indicator strips for the determination of various metallic ions, test strips are also available wherein, in one or more reaction zones, a gas is first produced, the presence of which can be detected by a secondary reaction in an indicator zone.

Such test strips wherein the thus-developed amount of gas provides an indirect means for measuring the substance to be detected can be employed, in principle, for a plurality of analytical reactions. Suitable measurable gases are, for example, ammonia, carbon dioxide, carbon monoxide, nitrogen oxides, hydrogen iodide, bromide, chloride, or fluoride, hydrogen cyanide, hydrogen sulfide, sulfur dioxide, volatile fatty acids, volatile aldehydes and ketones, etc.

In order to conduct the analytical determinations with such test strips, a reaction chamber unit is required, by means of which interference with the gas diffusion from the reaction zone into the indicator zone by air movement, which affects the accuracy of the test, can be avoided. The test strip for the determination of ammonia liberated from urea by means of urease, described, for example, in "Z. med. Labortechnik" [Periodical of Medical Laboratory Technique] 5, 319 (1964), has the disadvantage that the test strip must be clamped into a test tube in a manner such that the lower edge of the indicator zone is always positioned accurately the same height above the bottom of the test tube. Another essential disadvantage is that it is very difficult to introduce the test strip, which has been moistened at the reaction zone with material to be tested, into the test tube without moistening the walls of the vessel, with resulting contamination of the indicator zone.

The above-described disadvantages can be avoided by the specially constructed reaction chamber unit of this invention.

SUMMARY OF THE INVENTION

The reaction chamber unit of this invention is for test strips with one or more reaction and indicator zones for the analytical determination of reactions involving gas evolution and comprises a slide tray which is open at the top and at one end for receiving the test strip, and a housing which is open at the bottom and one end to receive the slide tray, the tray and housing having inclined guide means to facilitate positioning the slide tray tightly against the inner surface of the housing and produce a receptacle for the test strips of defined volume and spacing between the tray bottom and the opposite surface of the cover. At least the housing is formed of clear plastic to permit viewing the indicator zone without disturbing the strip.

DRAWINGS

Preferred embodiments of the novel reaction chamber unit are illustrated in the drawings, in which:

FIG. 1 is a perspective view showing the unassembled slide tray and housing forming, when assembled, a reaction chamber unit, and a test strip suitable for insertion therein;

FIG. 2 is a longitudinal cross section side view of the assembled reaction chamber with test strip positioned therein;

FIG. 3 is a cross sectional end view of the assembled reaction chamber unit along line 3—3 of FIG. 2; and FIG. 4 is a similar end cross sectional view of another version of the reaction chamber unit having a plurality of connected housing with slide trays inserted therein.

DETAILED DISCUSSION

As shown in FIGS. 1–3 of the drawings, a single reaction chamber unit consists of a slide tray 1, and a housing or cover 3. A test strip 2 having separated impregnation 2b and indicator 2a zones, rests on the upper face of the bottom wall 4 of slide tray 1. The top 5 of the housing forms the top of the reaction chamber unit and the bottom 4 of the slide tray forms the bottom of the unit. A diagonal shoulder 6 projects from the top of the two outer faces of the sides of the slide tray 1 and a cooperatively positioned diagonal shoulder 7 projects from the bottom of the two inner faces of the sides of housing 3. The two pairs of shoulders 6 and 7 ensure a firm and tight connection between slide tray 1 and housing 3.

The open end of slide tray 1 has a portion 1a, extending beyond the corresponding open end of housing 3, with serrated edges 1b on its side walls for gripping the slide tray while inserting it into the housing.

In the alternate embodiment shown in FIG. 4, the housing 5a forms a plurality of receptacles for the slide trays 1 with its interiorly positioned side walls having a shoulder 7 on both faces thereof forming guide means cooperating with the respective shoulders 6 on the outer faces of the side walls of slide trays 1.

Slide tray 1, which serves to receive the test strip 2, mm., the shape of a drawer open-ended at one end, the bottom of which is dimensioned to be approximately 1-2 mm. wider than the width of the test strips used in conjunction therewith. If this difference in width is greater, a meniscus is formed during the reaction on the indicator zone 2a of the test strip, which makes the read-off difficult in certain circumstances. The height of the walls of the slide tray 1, i.e., the spacing between the upper surface of the bottom 4 and/or the test strip inserted therein, and the facing lower surface 5 of the top of housing 3, is important. The spacing must be about 2-10 mm., preferably about 3-5 mm. For easier positioning of the test strip 2 in slide tray 1, it is advantageous to leave the front end wall of the slide tray 1 open. Suitably, the slide tray 1 is about 8-15 mm. longer than the housing and the sides of the tray are provided with gripping grooves on this extension for better grasping. With a dimension of the test strip 2 of, for example, 75 × 6 mm., the slide tray 1, in a preferred embodiment, has a total length of about 70-80 mm. and an inside width of about 7-8 mm.

The housing 3 serves as a seal for the open top of the slide tray 2 opposite the bottom 4. The housing 3 can by cylindrical or also prismatic. In the simplest case, the housing 3 has the shape of a three-sided rectangular cuvette which is open along its bottom, as it is utilized, for example, for photometric measurements. Preferably, the housing 3 is constructed like a sliding lid, whose bottom and one end face are open. In this case, the slide and the sliding lid carry means ensuring a firm and tight connection after both parts have been joined. For this purpose, the slide tray 1 has a projecting edge or shoulder 6 extending diagonally from the top of both sides, along the outside lateral surface, and the housing has corresponding projecting edges or shoulders 7 extending from the bottom of both sides, along the inside lateral surface in a correspondingly diagonal direction. Shoulders 6 on the outside lateral surfaces of the slide tray 1 have an upward slope, from the gripping grooves 1b to the rear end wall 1c, of about 2°.

It is advantageous to join several reaction chamber units in parallel with one another using a common housing 5a, as shown in FIG. 4. In this way, when connecting, for example, five to six individual reaction chambers, a system is obtained in the form of a prism with a square base having a lateral length of about 6–8 cm. and a height of about 5–8 mm.

Suitable materials for producing the housing 3 are transparent synthetic resins, e.g., polystyrene, polyacrylonitrile, polyacrylates, polymethacrylates, polyolefins, polyvinyl chloride, etc. For the slide tray 1, a great variety of synthetic resins can be utilized. Suitable materials are, e.g., synthetic resins of polyethylene, polypropylene, polyvinyl polymers, or copolymers, such as polyvinyl chloride, polyvinyl acetate, polyvinylidene chloride, polyethylene glycol tetrephthalic acid esters, polyamides, etc. The thickness of the plastic employed is uncritical. This thickness should range in the order of about 0.5–1.5 mm., so that the parts of the unit are not easily deformable.

To conduct a test, the reaction zone applied to the lower end 2b of the synthetic resin film test strip 2 is immersed for about 5–10 seconds into the liquid to be tested. During this step, the indicator zone 2a which is provided a few millimeters thereabove must not be moistened. Any excess liquid is wiped off and the test strip 2 is placed into the slide tray 1 from above in such a manner that the film contacts the bottom of the slide tray 1 and the moistened reaction zone slightly abuts the end wall 1c of the slide tray 1. The slide tray 1, with the test strip 2 positioned therein, is then pushed into the housing 3 until it abuts therein. After a predetermined period of time, the color change of the indicator zone caused by the gas liberated in the reaction zone can be read off through the transparent topside of the housing 3 and can be evaluated.

Consequently, it becomes possible for the first time with the aid of the reaction chamber unit of the present invention to carry out exact analytical determinations with the aid of gas evolution reactions, without an adjustment of the test strip and without incurring the contamination of the indicator zone which heretofore could be avoided only with difficulties. The results attainable thereby are based, above all, on the always constant gas space above the test strip, ensured by the novel reaction chamber unit.

It is advantageous to keep the test strips in closed boxes for preventing contamination of the zones before using.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A reaction chamber unit for test strips, comprising a slide tray which is open at the top and at one end, and has a planar lower surface for receiving the test strip, a housing for said tray formed of a clear plastic which is open at the bottom and at one end for receiving said tray, the inner upper surface of said housing being planar, parallel to said planar lower surface of said tray, said planar surfaces having a precise, predetermined distance of separation of about 2–10 MM. when said tray is properly positioned in said housing, and guide means for guiding said tray into a precise fit in said housing, said guide means comprising a pair of diagonally extending shoulders on the outside surface of the side walls of said tray and a pair of cooperatively engaging corresponding diagonal shoulders on the inside face of the side walls of said housing, whereby said planar surfaces are automatically drawn into precise spatial relationship by the entry of said tray into said housing.

2. A reaction chamber unit according to claim 1, wherein said slide tray is open at the same end as said housing.

3. A reaction chamber unit according to claim 1, wherein said slide tray extends beyond said housing when fully inserted therein for facilitating the gripping of the tray.

4. A reaction chamber unit according to claim 1, wherein said housing has a plurality of downward projecting sides joined to a common top forming, when a corresponding number of trays are inserted therein, a plurality of parallel positioned reaction chamber units.

5. A reaction chamber unit for test strips, comprising a slide tray which is open at the top and at one end, and has a planar lower surface for receiving the test strip, a housing for said tray formed of a clear plastic which is open at the bottom and at one end for receiving said tray, the inner upper surface of said housing being planar, parallel to said planar lower surface of said tray, said planar surfaces having a precise, predetermined distance of separation when said tray is properly positioned in said housing, and guide means for guiding said tray into a precise fit in said housing, said guide means comprising a pair of diagonally extending shoulders on the outside surface of the side walls of said tray and a pair of cooperatively engaging corresponding diagonal shoulders on the inside face of the side walls of said housing, whereby said planar surfaces are automatically drawn into precise spatial relationship by the entry of said tray into said housing, said slide tray being open at the same end as said housing, and wherein said slide tray has a portion extending beyond said housing when fully inserted therein, and said extending portion is serrated for facilitating the gripping of the tray.

6. A reaction chamber unit for test strips, comprising a slide tray which is open at the top and at one end, and has a planar lower surface for receiving the test strip, a housing for said tray formed of a clear plastic which is open at the bottom and at one end for receiving said tray, the inner upper surface of said housing being planar, parallel to said planar lower surface of said tray, said planar surfaces having a precise, predetermined distance of separation when said tray is properly positioned in said housing, and guide means for guiding said tray into a precise fit in said housing, said guide means comprising a pair of diagonally extending shoulders on the outside surface of the side walls of said tray and a pair of cooperatively engaging corresponding diagonal shoulders on the inside faces of the side walls of said housing, whereby said planar surfaces are automatically drawn into precise spatial relationship by the entry of said tray into said housing and wherein said housing has a plurality of downward projecting sides joined to a common top forming, when corresponding trays are inserted therein, a plurality of parallel positioned reaction chamber units, and wherein each of said slide trays is open at the same end as said housing, and wherein said slide trays have portions extending beyond said housing when fully inserted therein, and said extending portions are serrated for facilitating the gripping of the trays.

* * * * *